United States Patent [19]
Lindroos et al.

[11] 4,228,133
[45] Oct. 14, 1980

[54] APPARATUS FOR SULFATIZING ROASTING OF A FINELY-DIVIDED SELENIUM-BEARING RAW MATERIAL

[75] Inventors: Leo E. Lindroos; Ahti E. Turpeinen, both of Pori; Aarne A. Kapanen, Espoo, all of Finland

[73] Assignee: Outokumpu Oy, Helsinki, Finland

[21] Appl. No.: 14,433

[22] Filed: Feb. 23, 1979

[30] Foreign Application Priority Data

Feb. 24, 1978 [FI] Finland ................................ 780628

[51] Int. Cl.[2] ............................ B01J 3/04; F27B 9/16
[52] U.S. Cl. .................................... 422/195; 422/199; 422/225; 422/233; 432/142
[58] Field of Search ............... 422/193, 195, 199, 225, 422/236, 232, 233, 237; 423/508, 509; 432/139, 142, 151, 234, 235

[56] References Cited

U.S. PATENT DOCUMENTS

| | | | |
|---|---|---|---|
| 136,463 | 3/1873 | Solvay | 422/193 |
| 492,551 | 2/1893 | Frasch | 422/233 |
| 530,996 | 12/1894 | Kellner | 422/233 |
| 2,012,098 | 8/1935 | Haase et al. | 422/232 |
| 2,433,498 | 12/1947 | Whitford | 422/193 |
| 2,582,317 | 1/1952 | Donohue | 422/193 |
| 2,948,591 | 8/1960 | Handwerk et al. | 423/509 |
| 3,060,005 | 10/1962 | Litchfield | 422/233 |

FOREIGN PATENT DOCUMENTS

| | | | |
|---|---|---|---|
| 205125 | 12/1906 | Fed. Rep. of Germany | 263/26 |
| 318177 | 8/1916 | Fed. Rep. of Germany | 422/199 |
| 72877 | 4/1927 | Sweden | 263/26 |

*Primary Examiner*—S. Leon Bashore
*Assistant Examiner*—Chris Konkol
*Attorney, Agent, or Firm*—Brooks, Haidt, Haffner & Delahunty

[57] ABSTRACT

An apparatus for the sulfatizing roasting of a selenium-containing raw material, especially the anode slime from copper electrolysis, with sulfuric acid at a raised temperature, the apparatus comprising a furnace chamber having a feed pipe for feeding a slurry of a finely-divided, selenium-containing raw material and sulfuric acid into the furnace chamber, an outlet for withdrawing the roasted solid from the furnace chamber, an outlet for discharging the selenium bearing gases produced during the sulfating roasting, members for heating the slurry in the furnace chamber, and devices for transferring, as a layer, the slurry fed into the furnace chamber from the slurry feed point towards the outlet for solid, the members for transferring the slurry being one or more combinations of a tray which supports slurry and a scraper which scrapes the tray, at least some of the slurry-heating members being mounted in the tray in order to heat it.

5 Claims, 2 Drawing Figures

APPARATUS FOR SULFATIZING ROASTING OF A FINELY-DIVIDED SELENIUM-BEARING RAW MATERIAL

BACKGROUND OF THE INVENTION

The present invention relates to an apparatus for the sulfatizing roasting of a finely-divided selenium-containing raw material, especially the anode slime from copper electrolysis, with sulfuric acid, at a raised temperature; the apparatus includes a furnace chamber having a feed pipe for feeding a slurry composed of a finely-divided selenium-containing raw material and sulfuric acid into the furnace chamber, an outlet for withdrawing the roasted solid material from the furnace chamber, an outlet for removing from the furnace chamber the selenium-bearing gases produced during the sulfatizing roasting, members for heating the slurry in the furnace chamber, and devices for conveying, as a layer, the slurry fed into the furnace chamber from the feeding point of the slurry towards the outlet for solid material.

Several processes have been developed for industrial use for the production of selenium from selenium-containing raw materials, especially the anode slime from copper electrolysis. Among these, the processes based on the roasting of the raw material are those most common in practice. The most important roasting methods are soda roasting and sulfating roasting. Soda roasting does give a good yield of selenium, but the process has a disadvantage in the multi-stage recovery of selenium from the alkali selenites and selanates produced in the absorption of the gases. Problems of work hygiene constitute another disadvantage.

Sulfuric acid roasting, i.e. sulfatizing roasting, is also a process used in industrial production. It is based on the following reaction:

$$Se+2H_2SO_4 \rightleftarrows SeO_2+2SO_2+2H_2O$$

The gaseous products of reaction produced in the roasting are fed into absorption devices, in which the selenium dioxide is first dissolved as a selenous acid, whereafter it is reduced to elemental selenium by means of chemical precipitation. The process can also be controlled so that the gases produced in the roasting are immediately cooled in the absorption device, in which case the above reaction proceeds from the right to the left, yielding elemental selenium as a product.

The latter process and an apparatus for carrying it out have been introduced in Finnish Pat. No. 46 054. This is a batch process, in which a mixture of slime and sulfuric acid is batched into a closed muffel in shallow vessels; the muffel if heated externally to the temperature required by the roasting reaction, 500°-700° C. The reaction gases produced, $SeO_2$, $SO_2$, and $H_2O$, are immediately fed into a venturi washer, where they react at 60°-80° C., thereby producing elemental selenium.

The above-mentioned selenium furnace is technically well-suited for production, but its use is limited by its relatively low capacity for roasting selenium. A typical furnace batch is 400-700 kg of slurry, corresponding to a production of 40-200 kg of selenium per batch. The batching and discharging operations of the roasting furnace require manual labor, and the manual handling of sulfuric-acid bearing slurry is complicated, if the height or diameter of the furnace is increased in order to increase the batch size. For this reason it is necessary to increase the thickness of the batch layer to 100-300 mm, which results in a slower removal of the gaseous products of reaction. The retention time in selenium removal is respectively long. approx. 24-48 hours/batch. A raised temperature produces a sintering effect, which clogs the diffusion conduits required for the removal of the gas and thereby lengthens the reaction time.

For the above reasons the selenium-removing device of the muffel furnace type is in practice limited to slurry quantities of 50-80 t/year, and respectively several furnace units in parallel are required for increasing the production capacity.

Finnish Pat. No. 28 803 discloses a selenium furnace in which slurry is fed onto an endless belt as a thin layer. The slurry is conveyed on this belt through the furnace, which is heated indirectly and into which air is fed simultaneously in order to oxidize the selenium. In this apparatus the slurry is heated by means of heat of radiation, and the roasting and vaporization of selenium are performed using air or an oxygen-bearing gas, adding compounds, such as metal oxides, which accelerate the roasting, and avoiding the increasing of the sulfur content of the slurry. Such a process has proven to be relatively slow, and it has not been applied successfully on an industrial scale.

The object of the present invention is therefore to provide an apparatus for the sulfatizing roasting of a finely-divided selenium-containing raw material, especially the anode slime from the electrolysis of copper, with sulfuric acid at a raised temperature, an apparatus which is continuous-working, has a more effective transfer of heat into the slurry than previously, and thereby a higher capacity than previously.

SUMMARY OF THE INVENTION

In the apparatus according to the invention, slurry is conveyed through the furnace chamber as a thin layer on one or several heated trays, either by rotating the tray with the slurry on it around a vertical shaft under the slurry inlet pipe and by removing the roasted solid material from the tray with a scraper before feeding fresh slurry onto the tray or by feeding slurry as an even layer onto a fixed heated tray in the furnace, a scraper removing the roasted solid material from the tray. It is evident that both the tray and the scraper can be movable, the essential point being that the tray and the scraper move in relation to each other, so that the roasted solid material can be removed from the tray and possibly the slurry can be spread into an even layer on the tray.

In the apparatus according to the invention the tray is heated directly, preferably either inductively or by means of electric resistors, whereby the transfer of heat into the slurry on the tray is of maximal efficiency and can be controlled rapidly and with precision so that the roasted product will not sinter.

When several trays are used, they are preferably placed one above the other in one furnace chamber so that slurry removed with scrapers from one plate can be dropped onto the plate below. By this procedure a high capacity can be achieved even with small-sized apparatus.

DESCRIPTION OF THE PREFERRED EMBODIMENTS

Figure 1:
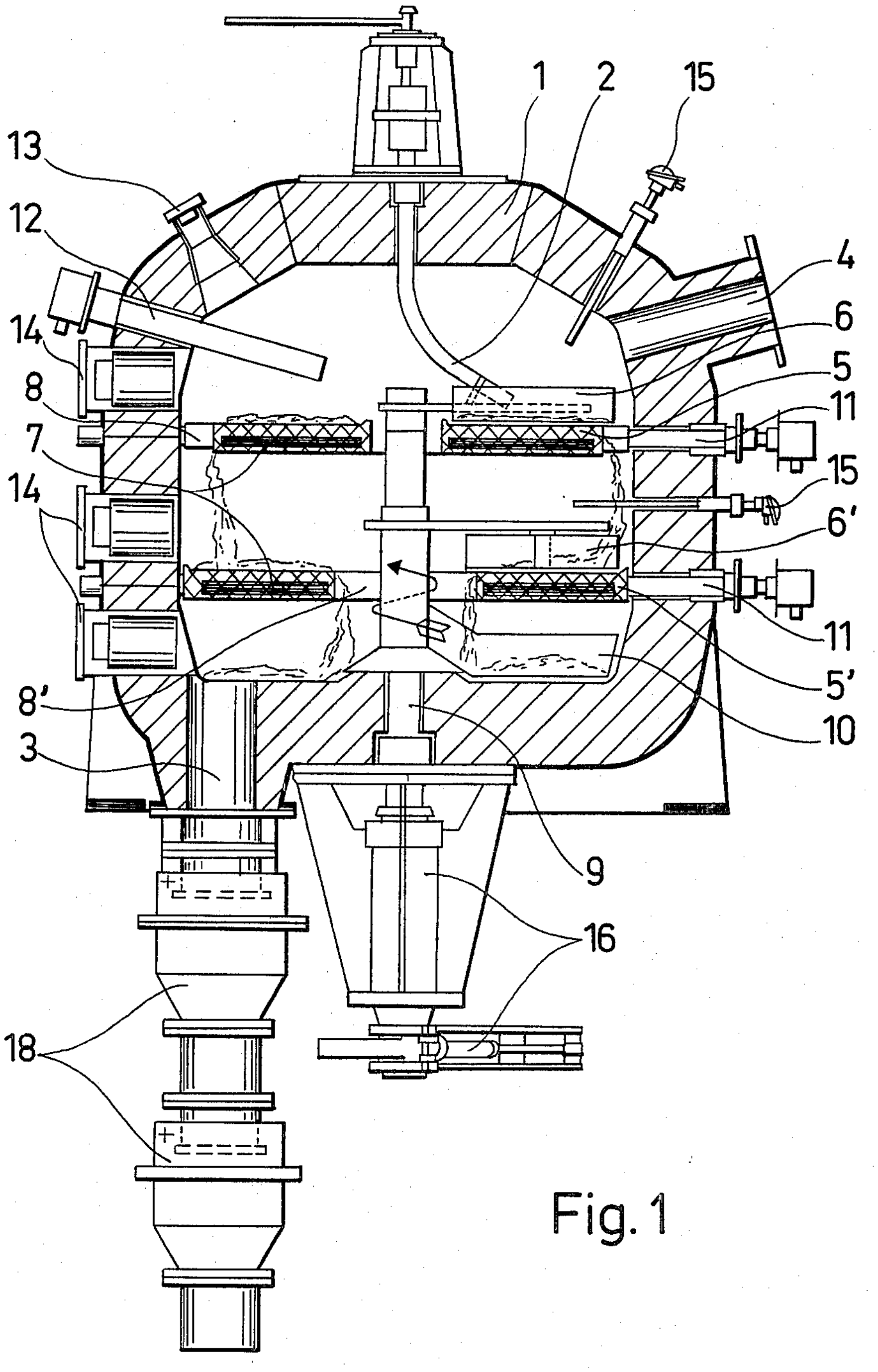
FIG. 1 depicts a vertical cross section of a preferred embodiment of the invention.

In FIG. 1, the furnace chamber is indicated by 1. A feed pipe 2 rotatable about its vertical axis and with its lower end bent to the side, has been fitted centrally through the top of the furnace chamber 1. In the floor of the furnace chamber there is, furthermore, an outlet 3 for withdrawing the roasted solid from the furnace chamber 1 and in its upper section there is an outlet 4 for discharging the selenium-bearing gases produced during the sulfatizing roasting, for the recovery of selenium. In addition, two circular trays 5 and 5' have been fixed in the furnace chamber 1 at two horizontal planes, one above the other. There is also a vertical rotatable shaft 9 centrally fitted through the floor of the furnace chamber. The shaft 9 extends through the center of the trays to above the upper tray 5, and scrapers 6, 6' and 10 have been mounted on the shaft at various levels so that the topmost scraper 6 scrapes the floor of the topmost tray 5, the middle scraper 6' scrapes the floor of the lower plate 5', and the lowest scraper scrapes the floor of the furnace chamber 1.

The lower end of the slurry feed pipe 2, rotated concentrically with the shaft 9, has been attached to the scraper 6 scraping the upper tray 5, in order to feed slurry onto the upper tray 5 on the trailing side of the scraper 6. The scraper 6 consists of one or more parts and it curves spirally towards the outer edge of the tray in order to transfer slurry towards the peripheral edge of the upper tray 5, the edge being at some distance from the inner wall of the furnace chamber 1 in order to form openings 8 between the upper tray 5 and the inner wall of the furnace chamber 1, so that the batch treated on the upper tray 5 can fall onto the tray 5' below, the diameter of which is greater than that of the upper tray 5.

For its part, the scraper 6' of the lower tray 5' curves forwards spirally towards the outer edge of the tray in order to transfer the batch falling close to the periphery of the lower tray 5' towards the center, the lower tray 5' having a large centered aperture 8' for dropping the roasted solid to the floor of the furnace chamber. The scraper 6' has been divided into two (or more) scraper parts, the inner one leading, and their sweeping areas overlapping to some extent. The lowest scraper 10 finally transfers the roasted solid which has fallen onto the furnace of the furnace chamber into the outlet 3, and from there on out through a cooling double-gate device 18.

For heating the slurry the trays 5 and 5' have been provided with resistor elements 7, which have been connected to outside sources of power (not in the figure) through inlets fitted in the supports 11 of the trays 5 and 5'. The trays 5 and 5' are heated by the electric resistors 7 and thereby the layer to be roasted on top of them is also heated effectively. Furthermore, several bar-like electric resistors 12 for heating the gas chamber have been fitted through the wall of the furnace chamber, as have temperature sensors 15.

In FIG. 1, reference numeral 13 indicates an observation window and 14 the maintenance hatches. The direction of rotation of the shaft 9 and the scrapers 6, 6' and 10 is indicated by an arrow in FIG. 1. The motion of the rotating mechanism of the shaft 9 and the scrapers 6, 6' and 10 can be produced hydraulically, mechanically or by other similar means (in the figure it is with a hydraulic cylinder).

The power of the electric resistors 7 in the upper tray 5 is preferably about 0.6 kWh/1 kg and in the lower plate 5' preferably half of it, i.e. about 0.3 kWh/1 kg slurry in order to heat the trays 5 and 5' to about 700° C. By means of the electric resistors 12 it is ensured that the temperature of the gas phase remains at about 500° C. above the tray 5, at about 600° C. above the lower tray 5', and at about 450° C. above the floor of the furnace chamber.

The mutual positions of the scrapers 6, 6' and 10 have been graduated so that the upper scraper drops roasted slurry or solid to the trailing side of a lower scraper. The movement of the scrapers 6, 6' and 10 can be continuously progressive or periodical, for example in sequences of about 30°, in which case the period of rotation can advantageously be adjusted between 4 and 12 minutes.

Figure 2:
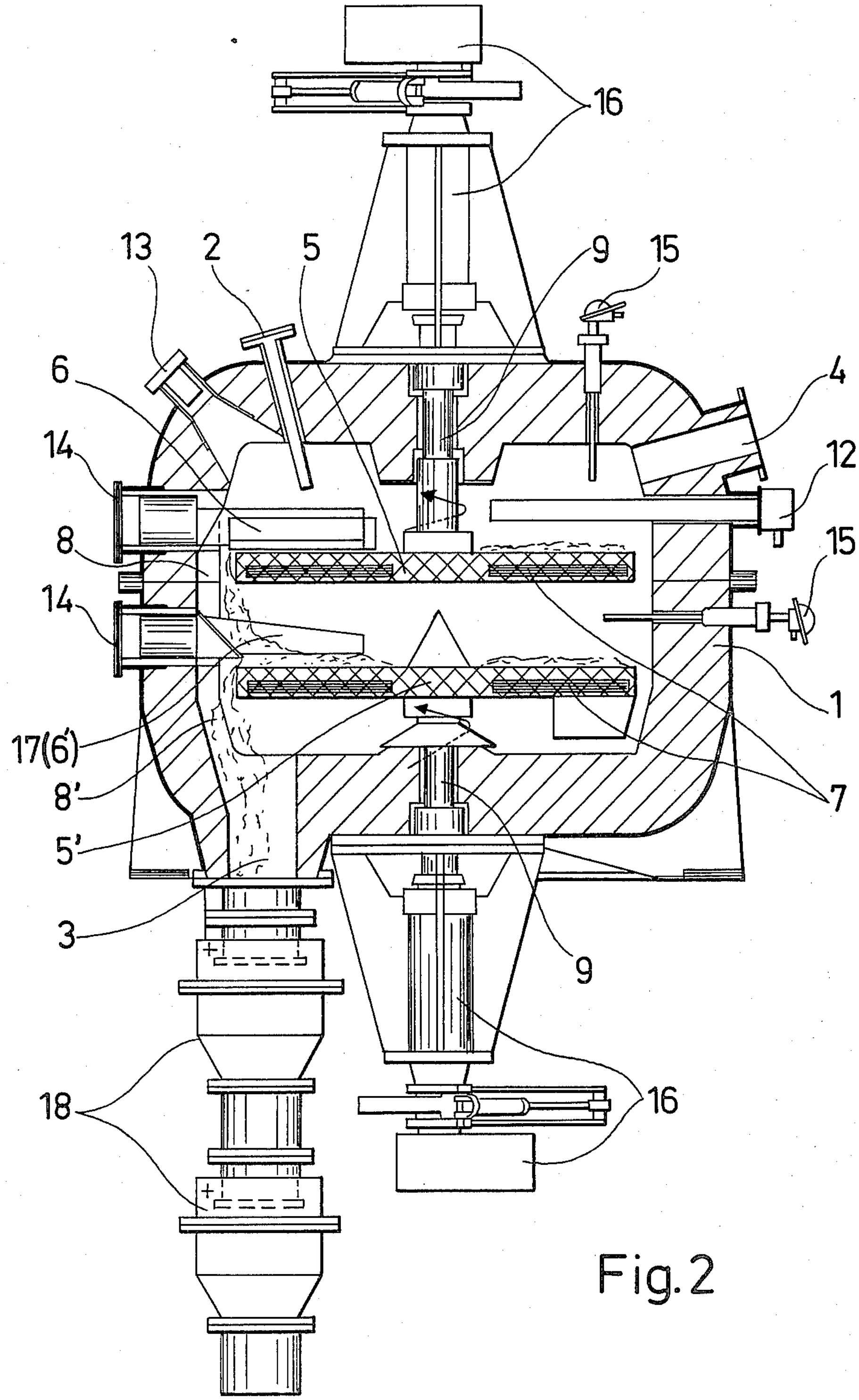
FIG. 2 depicts a vertical cross section of another embodiment of the invention.

The reference numerals used in FIG. 2 are the same as in FIG. 1. The apparatus depicted in FIG. 2 deviates from the embodiment shown in FIG. 1 mainly in that its trays 5 and 5' have been fitted so that they are rotatable but the scrapers 6 and 6' are fixed.

The upper tray 5 has been fitted to rotate about a vertical shaft 9 passing through the top of the furnace chamber 1. At the upper end of the shaft 9 there are devices 16 for rotating the shaft 9 and the tray 5 attached to its lower end and for leading the current to the resistor elements 7 in the tray. The lower tray 5' has been mounted respectively at the upper end of the rotatable shaft 9 running through the floor of the furnace chamber 1. The upper end of the shaft 9 is concentric with the shaft 9 mentioned above and at its lower end there are respective devices 16. The upper and the lower trays 5 and 5' can thus be rotated either at the same speed or at different speeds.

In addition, a fixed pipe 2 has been fitted through the top of the furnace chamber in order to feed slurry to the trailing side of the fixed scraper of the upper tray 5. The scraper 6 is curved in the rotational direction of the tray 5 towards the periphery in order to remove slurry to be roasted over the edge of the tray 5 into the shaft 8 formed in the inner wall of the furnace chamber 1 in order to drop the batch and direct it to the lower tray 5' to the trailing side of the scraper 6' scraping the lower tray 5', but in front of the scraper 17 fitted at the distance of the desired layer thickness from the tray 5' above the tray 5' in order to spread the batch dropped onto the lower tray evenly on this tray. The removing scraper 6' of the lower plate 5' transfers the roasted solid over the peripheral edge of the lower tray 5' into the outlet shaft 8' situated at this point; this shaft 8' continues as an outlet 3, whereafter the solid is cooled in a double-gate withdrawing device 18.

By regulating the rotational velocity of the reaction trays 5 and 5' and respectively the retention time, the desired selenium removal degree is achieved. It has been shown that a retention time of 12–36 min at a reaction temperature of 600° C. is sufficient for removing >99% of the selenium of the product. At the same time it has been observed that the degree of purity of the selenium precipitated in absorption devices is the same as in a batch process performed in the muffel furnace described above.

The advantage of the apparatus according to the invention over previously known apparatus consists of its substantially higher capacity. The selenium treatment capacity of a muffel furnace with outer dimensions corresponding to the tray furnace in question is at maximum 80 t/a, expressed as the dry weight of the feed slurry. The respective capacity of a continuous-working tray furnace is 300 t/a.

This means that the largest known purification plants treating raw materials of selenium, a quantity of 800–1000 t/a, would require only 3–4 tray furnace units for their selenium production, whereas the number of muffle furnaces required is currently 10–12 furnaces in parallel.

The apparatus is described below in more detail by means of an example:

EXAMPLE

A continuous-working roasting furnace, with a roasting tray diameter of 1200 mm and a rotational velocity 10 r/h, produced by a periodically working hydraulic piston. The regulatable power of the electric resistors on the trays was 45 kW and in the gas chamber 13 kW. A mixture of noble-metal slurry and strong sulfuric acid was transferred into the roasting furnace by means of a membrane pump. The slurry contained 1 part by weight of noble-metal slurry, 0.4 part by weight of 93% sulfuric acid, and 0.03 part by weight of diatomite.

The composition of the feed slurry was: 20% Ag, 8% Se, 0.8% Ni and 1.8% Cu.

The slurry was fed onto the upper tray at 50 kg/h, the layer thickness on the tray being 2 mm. When the tray had rotated 9/10 of a rotation from the slurry feed point, a scraper blade detached the calcine from the tray and dropped it onto the lower tray, where its retention time corresponded to about two rotations. The total retention time on the trays was about 16 min, at 450°–600° C. The average yield of roasted product was 49 kg/h, of which selenium $<0.05\%$.

What is claimed is:

1. An apparatus for the sulfatizing roasting of selenium-containing raw material, especially anode slime from copper electrolysis, with sulfuric acid at a raised temperature, the apparatus comprising: a furnace chamber having an inlet for a slurry of finely-divided, selenium-containing raw material and sulfuric acid, an outlet for withdrawing roasted solid from the furnace chamber, an outlet for discharging selenium-bearing gases produced during the sulfatizing roasting, means for heating the slurry in the furnace chamber, and at least one combination of a tray supporting the slurry and a scraper scraping the tray for transferring, as a layer, the slurry fed into the furnace chamber from the slurry inlet towards the outlet for solid, at least some of the slurry-heating means being mounted in one tray in order to heat it, wherein the slurry inlet is a pipe bent to the side at its lower end and fitted through the top of the furnace chamber and concentrically rotatable with the trays or scrapers in order to distribute the slurry onto a topmost tray.

2. The apparatus of claim 1, in which there are a plurality of trays and the trays are heated by electrical heating means and are superimposed.

3. The apparatus of claim 1, in which the trays are fixed to the furnace chamber and the scrapers are adapted to move along the surface of the heated trays in order to distribute the slurry evenly on the tray and to transfer the slurry towards an outlet edge or opening in the tray.

4. The apparatus of claim 1, in which the trays are rotatable and the scrapers are fixed to the furnace chamber in such a manner that a lower scraper is on the leading side of the next scraper above.

5. The apparatus of claim 4, in which a scraper is at a small distance above a lower tray, on the trailing side of the next scraper above, in order to spread the slurry dropped on the lower tray into an even layer on this heated tray.

* * * * *